United States Patent Office 2,930,755
Patented Mar. 29, 1960

2,930,755

STABILIZATION OF WATER-IN-OIL EMULSION

Bob C. Crittendon, Midland, Tex., assignor, by mesne assignments, to Socony Mobil Oil Company, Inc., New York, N.Y., a corporation of New York No Drawing. Application August 15, 1955
Serial No. 528,524

5 Claims. (Cl. 252—8.5)

This invention relates to water-in-oil emulsion and relates more particularly to a stabilized water-in-oil emulsion.

In the drilling or in the treatment of wells, fluids find important use. For example, in the rotary drilling of wells, such as those for petroleum oil or gas, a drilling fluid is continuously circulated from the surface of the ground to the bottom of the well bore hole and back to the surface of the ground. The drilling fluid has various functions including those of lubricating the drill bit and pipe, carrying cuttings from the bottom of the well bore hole to the surface of the ground, and imposing a hydrostatic head on the drilled formation to prevent escape of oil, gas, or water therefrom into the well bore hole during the drilling operation. Ordinarily, aqueous drilling fluids comprising a suspension of a clay in water are employed. Aqueous drilling fluids are limited in the extent to which their specific gravities can be reduced and, where reduced specific gravities are required, drilling fluids having a fluid phase consisting entirely of oil or consisting of an emulsion of oil and water can be used.

Oil and water emulsion drilling fluids are less expensive and are more convenient to handle than drilling fluids having a fluid phase consisting entirely of oil and, therefore, of the two types, the oil and water emulsion drilling fluids are usually preferred. On the other hand, emulsion drilling fluids wherein the continuous phase of the emulsion is water, in common with aqueous drilling fluids, have been recognized to damage oil-producing formations by filtration of water from the fluid into the formations with consequent reduction in permeability and reduced rate of oil production. To avoid the damage to the formations arising from the use of aqueous and oil-in-water emulsion drilling fluids and yet retain advantages of the oil-in-water and the drilling fluids whose fluid phase consists entirely of oil, the use of water-in-oil emulsion fluids wherein the continuous phase is oil has been proposed. However, while effective for the purposes intended, water-in-oil emulsion drilling fluids are frequently unstable with the discontinuous phase tending to coalesce.

It is an object of this invention to provide a water-in-oil emulsion. It is another object of this invention to stabilize a water-in-oil emulsion. It is another object of this invention to provide a stable emulsion fluid for use in a well. These and other objects of the invention will become apparent from the following detailed description.

In accordance with the invention, there is provided a water-in-oil emulsion fluid containing as a stabilizing agent a resin derived from resinous wood characterized by freedom from wood rosin, solubility in alcohol, substantial insolubility in gasoline, a methoxy content of about 3% to about 6%, an acid number of about 100, a naphtha insolubility of about 98%, and a melting point of about 125° C.

I have found that the resin derived from resinous wood characterized by freedom from wood rosin, solubility in alcohol, substantial insolubility in gasoline, a methoxy content of about 3% to about 6%, an acid number of about 100, a naphtha insolubility of about 98%, and a melting point of about 125° C. imparts improved stability to water-in-oil emulsion containing the resin. Hereinafter, for purposes of simplification of description, this resin will be termed the "gasoline-insoluble resin." Water-in-oil emulsions containing the gasoline-insoluble resin maintain their stability under various conditions of temperature, contamination, and otherwise ordinarily causing coalescence of the dispersed phase. Accordingly, the emulsions may be employed in environments where emulsions ordinarily would not retain their desired properties.

The gasoline-insoluble resin is, as indicated by the descriptive adjective, substantially insoluble in gasoline and other petroleum hydrocarbons. The exact chemical composition of the resin is unknown. It has been determined that the resin has a methoxy content of about 3% to 6% which distinguishes it from oxidized wood rosin which has a methoxy content of about 0.3% to 0.4% and gum rosin which has a methoxy content of about 0.1% to 0.2%. The resin also contains among other things various oxidized resin acids, oxidized terpenes, polyphenols, polymerized terpenes, and highly complex ligneous substances. The resin is soluble and is chemically active in acetone. Further, it is capable of forming metallic derivatives such as the calcium derivative.

The resin may be obtained from pine wood. The pine wood can be extracted with a solvent capable in the cold of extracting, from the pine, wood rosin and resinous substances other than rosin. The solvent is evaporated from the extract leaving the extracted rosin and other resinous substances as a solid residue, which is then extracted with a solvent for rosin which will not dissolve the other resinous components of the original extract or solid residue and which are separated from the extract and comprise the resin.

The pine wood may be steamed before extraction or may be extracted without previous steaming. Where the pine wood is not previously steamed, turpentine and pine oil will usually be extracted by the solvent used for extracting rosin and other resinous substance. In some caes even though the wood be previously steamed, some turpentine and pine oil remaining in the wood will be extracted. Where turpentine and pine oil are present in the extract, they will be evaporated off in reduction of the extract to solid residue for extraction with a light petroleum hydrocarbon.

In one procedure for preparation of the gasoline-insoluble resin, pine wood, preferably from the Southern long leaf pine, with or without preliminary steaming of the wood chips to remove their turpentine and pine oil content, is extracted with a solvent which is a solvent for the rosin, turpentine, and pine oil contained in the wood chips, and which is also a solvent for other complex substances contained in the wood chips. Such a solvent may be, for example, a coal tar hydrocarbon, such as benzol, toluol, xylol, etc. The extraction may be accomplished by flooding the pine wood chips with the solvent, with or without the use of heat.

When the extraction of the chips has been sufficient, the coal tar hydrocarbon solution of matter extracted from the pine wood chips is drawn off the wood chips and the solvent evaporated and re-used in the process, if desired. Evaporation of the solvent leaves turpentine, pine oil, rosin and the gasoline-insoluble resin, all in admixture. The turpentine and pine oil are then removed by distillation, leaving a dark colored residue comprising a mixture of wood rosin and the gasoline-insoluble resin. This resinous mixture is then extracted with a substance which is a solvent for the rosin but not a solvent for the gasoline-insoluble resin. As such a solvent there may be used, for example, and preferably at an elevated temperature, a petroleum hydrocarbon such as petroleum ether, gasoline, heptane, hexane, etc.

When the residue from the coal tar hydrocarbon extraction has been sufficiently extracted by the petroleum hydrocarbon, a dark colored, resinous substance remains, which, when freed from occluded gasoline or other petroleum hydrocarbon, is the gasoline-insoluble resin. A typical sample of the gasoline-insoluble resin prepared by this procedure will have the following characteristics: melting point, A.S.T.M. drop method, 125° C., acid number 100, naphtha-insoluble matter 98%, petroleum ether-insoluble matter 96%, gasoline-soluble 8%, and water-soluble 0%.

In determination of characteristics, the naphtha-insoluble matter is determined by adding five grams of powdered resin to 10 cubic centimeters of V.M. and P. naphtha, 90% of which distills between 100° C. and 150° C., specific gravity about 0.75, warming to dissolve the resin, boiling under reflux 10 minutes, with shaking, cooling, adding 28 cubic centimeters of the same grade of naphtha while shaking, cooling to 20° C. for one hour, filtering the naphtha solution with insoluble matter in suspension through a tared Gooch crucible, using 25 cubic centimeters of the naphtha to wash out the flask or other container, and washing the precipitate with 50 cubic centimeters of the naphtha, drying overnight at 120–125° C., and weighing.

Also in the determination of characteristics, the gasoline-soluble matter is determined by adding to 50 grams of the resin 100 cubic centimeters of gasoline, boiling under reflux for 20 minutes, decanting into a separatory funnel, and repeating until four washes have been made, then washing the gasoline solution in the separatory funnel with cold water, cooling to 20° C., drawing off into a distillation flask, concentrating to 50–100 cc. volume, and evaporating to constant weight, to give the gasoline-soluble material.

The gasoline-insoluble resin is sold commercially by the Hercules Powder Company of Wilmington, Delaware, under the trade name of "Vinsol" resin.

In the practice of the invention, the gasoline-insoluble resin may be employed in connection with any type of water-in-oil emulsion subject to coalescence of the dispersed phase, where such coalescence is desirably avoided and the gasoline-insoluble resin does not otherwise affect the emulsion from the standpoint of precluding its intended use. Preferably, the gasoline-insoluble resin is employed in connection with water-in-oil emulsion fluids employed in well operations. These emulsion fluids may be employed for the treatment of wells. The gasoline-insoluble resin is most desirably employed, however, in connection with water-in-oil emulsion drilling fluids.

The gasoline-insoluble resin may be admixed with a water-in-oil emulsion at any time during the use of the emulsion. Thus, for example, in the drilling of a well employing a water-in-oil emulsion drilling fluid, the gasoline-insoluble resin may be added to the emulsion at any time subsequent to its preparation and during its use in the drilling of the well for improvement in the stability of the emulsion. The gasoline-insoluble resin may also be added to either the water or to the oil, or both, employed in preparation of the emulsion prior to admixture of the water and oil with each other and formation of the emulsion. The gasoline-insoluble resin may also be added to the water and oil subsequent to admixture with each other but prior to stirring, mixing, or other agitation employed to effect emulsification. During use of the emulsion, the gasoline-insoluble resin may be added at regular or irregular intervals or otherwise as desired to maintain a desired degree of stability or to increase stability to a desired degree.

The amount of gasoline-insoluble resin employed will depend upon the extent to which stability of the water-in-oil emulsion is to be increased. This in turn will depend upon the conditions affecting stability to which the emulsion is to be exposed. Generally, an amount of gasoline-insoluble resin between about one and twelve pounds per barrel of emulsion provides satisfactory stabilization. In this connection, by "barrel" is meant a 42 gallon barrel. However, larger and smaller amounts of gasoline-insoluble resin may be employed. Effective stabilization of emulsion drilling fluids has been effected employing five pounds of the gasoline-insoluble resin per barrel of drilling fluid. In any case, for attaining a desired degree of stability of an emulsion, increasing amounts of gasoline-insoluble resin may be added to the emulsion until the desired degree of stability is attained.

Where it is desired to determine the amount of gasoline-insoluble resin required to attain a desired degree of stability of an emulsion, the stability of the emulsion may be determined by any suitable method. A satisfactory method for determining stability of an emulsion involves imposing a gradually increasing electrical potential across electrodes immersed in the emulsion until flow of electrical current through the liquid between the electrodes begins. The electrical potential required to cause current flow to begin between electrodes spaced a given distance apart may be employed as a measure of the stability of the emulsion.

The gasoline-insoluble resin per se may be employed for stabilization of water-in-oil emulsion. However, it is prefered to employ the gasoline-insoluble resin in the form of its calcium derivative. The calcium derivative may be obtained by admixing the gasoline-insoluble resin in solution in a suitable solvent with a calcium compound capable of transferring the calcium ion to the resin. Suitable calcium compounds that may be employed include calcium chloride, calcium sulfate, and calcium hydroxide. The calcium derivative may also be obtained by converting the resin to its sodium or ammonium derivatives and these derivatives converted to the calcium derivative. If desired, the calcium compound may be added to the emulsion and reaction of the calcium compound with the gasoline-insoluble resin to form the calcium derivative can be effected in situ. Ordinarily, satisfactory results are obtained with this procedure where the temperature of the emulsion thereafter exceeds about 150–200° F. Where the emulsion is a drilling fluid or other fluid employed in the treatment of a well, for example, the calcium compound may be added to some or all of the water or some or all of the oil or to a mixture of some or all of the water and some or all of the oil and the gasoline-insoluble resin thereafter added. Also, the gasoline-insoluble resin may be added to a portion or all of the water or to the oil or to a mixture of some or all of the water and some or all of the oil and the calcium compound thereafter added. Conversion of the gasoline-insoluble resin to the calcium derivative may be effected after the emulsion has been in use for some time. In various water-in-oil emulsion fluids, particularly those employed as a drilling fluid, calcium compounds such as calcium chloride or calcium hydroxide are desirably present in the emulsions for various purposes and the compounds may serve the additional function of providing the calcium ion forming the calcium derivative of the gasoline-insoluble resin.

The water-in-oil emulsions in which the gasoline-insoluble resin is employed may contain any oil suitable therefor considering the intended purpose of the emulsion. The oil may be a mineral oil or hydrocarbon oil, a vegetable oil, or an animal oil. Where the emulsion is to be employed in the treatment of wells, a mineral oil such as petroleum crude oil, diesel oil, fuel oil, gas oil, or the like may be employed.

The amount of the oil in the emulsion will depend also upon the intended use of the emulsion. In the case of well treating fluids, such as drilling fluids, the amount of oil may constitute between about 20% and 85% by volume of the emulsion.

It is preferred that the water-in-oil emulsion contain additionally to the gasoline-insoluble resin an emulsifying agent. The emulsifying agent may be any known emulsifying agent. Suitable emulsifying agents include ammonium linoleate, alkali metal salt of carboxymethylcellulose, alkali metal or ammonium soaps of unsaturated cyclic acids such as the rosin acids, alkali metal or ammonium soaps of saturated cyclic acids such as naphthenic acids, alkali metal alkyl sulfonates, alkyl and aryl sulfonates, sulfonated oils, fatty acids, glycerol and other alcohols, fatty acid soaps and their derivatives, polyphosphate compounds such as pyrophosphates, sea moss or weed extracts such as algenates and algin soaps, extracts of substances such as tannins, humins, lignins, ulmins, alkali metal soaps of unsaturated fatty acids such as linolic and linolenic acids, sulfated alcohols, aliphatic and naphthenic sulfonates, anhydrosorbitol monooleate, polyoxyethylene sorbitol tetrooleate, and others. The amount of these and other emulsifying agents employed may be between about 0.05 and 5.0 percent by weight of the emulsion. However, the amount may be greater or lesser and will depend primarily upon the particular emulsifying agent employed.

While any suitable type of emulsifying agent may be employed, it is preferred to employ as emulsifying agent tall oil or a salt thereof. Further, where tall oil is employed as emulsifying agent, it is preferred to employ blown tall oil. It is particularly preferred to employ blown tall oil which has been prepared by subjecting tall oil to the action of oxygen for such time and such temperature that its viscosity measured in Saybolt Universal seconds has increased to between 150 and 175 percent of its original value.

Improvement in the properties of the emulsion can be effected by admixture with a quaternary amine. By a quaternary amine, I mean any ammonium compound wherein four of the five nitrogen valences are satisfied with organic radicals and the fifth valence is satisfied with an inorganic anion. These compounds have the general formula:

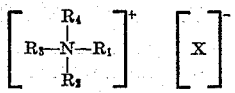

wherein $R_1$, $R_2$, $R_3$, and $R_4$ are organic radicals and X is an inorganic anion. Each of $R_1$, $R_2$, $R_3$, and $R_4$ may be the same organic radical or may be different organic radicals. The organic radicals may be aryl, alkyl, aralkyl, or alkaryl radicals. The organic radicals may consist entirely of carbon and hydrogen and be saturated or unsaturated or may consist of carbon and hydrogen along with oxygen, sulfur, nitrogen, phosphorous, halogen, or other metallic or non-metallic element. The inorganic anion may be any inorganic anion capable of satisfying the fifth valence of the nitrogen. These anions include the hydroxide, sulfate, nitrate, chloride, bromide, iodide, fluoride, carbonate, bicarbonate, phosphate, and other anions. Quaternary amines which may be employed include tetramethyl ammonium chloride, tetraethyl ammonium chloride, tetrapropyl ammonium chloride, trimethyl monoethyl ammonium bromide, dimethyl diethyl ammonium iodide, dimethyl didodecyl ammonium chloride, etc. A preferred quaternary amine is dimethyl didodecyl ammonium chloride.

Various other materials may be in admixture with the emulsion. These may include, as stated above, calcium compounds such as calcium chloride or calcium oxide. The fluids may contain solid material such as clays to impart desired viscometric properties to the emulsion or weighting agents to impart desired density to the emulsion. The clays may be bentonites, monmorillonites, illites, kaolinites, attapulgites, and other types of conventional clays. The weighting agents may be barites, iron oxide, lead oxide, oyster shells, and other conventional weighting agents. The clays or weighting agents or both may be in admixture with water at the time of admixture with other components of the emulsion. Thus, an aqueous slurry of clay or weighting agent or both may be admixed with another component or components of the emulsion. The water of the slurry where this procedure is employed may therefore supply part or all of the water constituting the dispersed water phase of the emulsion. The aqueous slurry may be an aqueous drilling fluid or an oil-in-water emulsion drilling fluid previously used in the drilling of a well.

In a preferred embodiment of the invention, the gasoline-insoluble resin is in admixture with an emulsion containing blown tall oil and quaternary amine. In another preferred embodiment of the invention the gasoline-insoluble resin is in admixture with an emulsion containing a water-insoluble salt of a sulfonated aromatic hydrocarbon and a compound having emulsifying properties and being a water-insoluble salt of a sulfuric acid derivative of an aliphatic ester, a substituted oxazoline, a derivative of a polyoxyalkylene, or an ester of sorbitan. The sulfonated aromatic hydrocarbon may be a petroleum sulfonate and the sulfuric acid derivative of an aliphatic ester may be the product obtained by reaction between any aliphatic ester such as a vegetable oil or an animal oil, including sperm oil, and a sulfonating or sulfating agent. This emulsion may also contain a water-insoluble salt of a resin acid. Each of these emulsions may also contain clays, weighting agents, or calcium compounds.

The following examples will be illustrative of the invention.

EXAMPLE I

A water-in-oil emulsion for use as a fluid in the drilling of a well was prepared having the following composition:

| Component | Amount |
| --- | --- |
| Diesel oil | 50% by volume of oil and water mixture. |
| Water-base drilling fluid | Do. |
| Petroleum sulfonate | 10 lb./bbl of finished emulsion. |
| Sulfonated sperm oil | 5 lb./bbl of finished emulsion. |
| Calcium chloride | Do. |
| Lime | 3 lb./bbl. of finished emulsion. |
| Gasoline-insoluble resin | 1 lb./bbl of finished emulsion. |

In the preparation of this emulsion, the total amount of the petroleum sulfonate and sulfonated sperm oil was added to the diesel oil and mixed. Thereafter, a portion of the calcium chloride amounting to three pounds per barrel of the finished emulsion was added and thoroughly mixed. The entire amount of the water base drilling fluid was then added followed by the lime and the remainder of the calcium chloride. The gasoline-insoluble resin was next added to the mixture and the mixture stirred.

The resulting emulsion was tested for filter loss, stability, and viscosity. The test for filter loss was made in accordance with the API 30-minute filter loss test. The stability was measured by determining the potential required to be applied across strip electrodes one-eighth inch in width and one-eighth inch apart immersed in the emulsion in order to obtain a current flow through the emulsion. The viscosity was measured employing a Marsh funnel. The table gives the results.

Table 1

Filter loss, cubic centimeters _____ Zero
Stability, volts _____ 100
Viscosity, seconds _____ 150

EXAMPLE II

This example will illustrate the stabilizing effect of gasoline-insoluble resin on an emulsion drilling fluid.

Water-in-oil emulsion drilling fluid containing blown tall oil as emulsifying agent and dimethyl didodecyl ammonium chloride to assist in emulsification was employed in the drilling of a well. Four samples of this emulsion were taken. The first sample of the emulsion was aged for 72 hours at a temperature of 170° F. and the second sample was aged for 72 hours at a temperature of 350° F. To the third sample and fourth sample of the drilling fluid were each added gasoline-insoluble resin in the amount of five pounds per barrel of the emulsion. The third sample was then aged for 72 hours at 170° F. and the fourth sample was aged for 72 hours at 350° F. Thereafter, each of the four samples was tested for filter loss and stability. The filter loss and stability tests were made similarly as in Example I. The results are given in the table.

*Table II*

| Sample No. | Filter Loss, Cubic Centimeters | Stability |
|---|---|---|
| 1 | Zero | 200 |
| 2 | 3.5 | 30 |
| 3 | Zero | 250 |
| 4 | Zero | 600 |

It will be observed from the table that the addition of the gasoline-insoluble resin increased the stability of the emulsion aged for 72 hours at 170° F. from 200 volts to 250 volts. It will also be observed that in the case of the emulsion aged for 72 hours at 350° F., the addition of the gasoline-insoluble resin increased the stability from 30 volts to 600 volts. The addition of the gasoline-insoluble resin also improved the filter loss of this emulsion aged at 350° F.

Having thus described my invention, it will be understood that such description has been given by way of illustration and example, and not by way of limitation, reference for the latter purpose being had to the appended claims.

I claim:

1. An emulsion fluid comprising in admixture water, oil, blown tall oil, and a resin derived from resinous wood and characterized by freedom from wood rosin, solubility in alcohol, substantial insolubility in gasoline, a methoxy content of about 3% to about 6%, an acid number of about 100, a naphtha insolubility of about 98%, and a melting point of about 125° C.

2. An emulsion fluid comprising in admixture water, oil, blown tall oil, a quaternary amine, and a resin derived from resinous wood and characterized by freedom from wood rosin, solubility in alcohol, substantial insolubility in gasoline, a methoxy content of about 3% to about 6%, an acid number of about 100, a naphtha insolubility of about 98%, and a melting point of about 125° C.

3. In a process for drilling a well wherein a drilling fluid is pumped to said well the steps including preparing a drilling fluid comprising admixing water, oil, blown tall oil, and resin derived from resinous wood and characterized by freedom from wood rosin, solubility in alcohol, substantial insolubility in gasoline, a methoxy content of about 3% to about 6%, an acid number of about 100, a naphtha insolubility of about 98%, and a melting point of about 125° C., and pumping said drilling fluid to said well.

4. In a process for drilling a well wherein a drilling fluid is pumped to said well, the steps including preparing a drilling fluid comprising admixing water, oil, blown tall oil which has been prepared by subjecting tall oil to the action of oxygen for such time and such temperature that its viscosity measured in Saybolt Universal seconds has increased to between 150 and 175% of its original value, and resin derived from resinous wood and characterized by freedom from wood rosin, solubility in alcohol, substantial insolubility in gasoline, a methoxy content of about 3% to about 6%, an acid number of about 100, a naphtha insolubility of about 98%, and a melting point of about 125° C., and pumping said drilling fluid to said well.

5. An emulsion fluid comprising in admixture water, oil, blown tall oil which has been prepared by subjecting tall oil to the action of oxygen for such time and such temperature that its viscosity measured in Saybolt Universal seconds has increased to between 150 and 175% of its original value, and a resin derived from resinous wood and characterized by freedom from wood rosin, solubility in alcohol, substantial insolubility in gasoline, a methoxy content of about 3% to about 6%, an acid number of about 100, a naphtha insolubility of about 98%, and a melting point of about 125° C.

References Cited in the file of this patent

UNITED STATES PATENTS

| 2,509,588 | Dawson | May 30, 1950 |
| 2,557,647 | Gates et al. | June 19, 1951 |
| 2,612,471 | Fischer | Sept. 30, 1952 |
| 2,617,767 | Fischer | Nov. 11, 1952 |
| 2,659,695 | Faust | Nov. 17, 1953 |
| 2,675,353 | Dawson | Apr. 13, 1954 |
| 2,702,787 | Freeland | Feb. 22, 1955 |